(12) United States Patent
Niioka

(10) Patent No.: US 7,233,014 B2
(45) Date of Patent: Jun. 19, 2007

(54) MEDIUM DETECTION APPARATUS AND MEDIUM DETECTION METHOD

(75) Inventor: Koji Niioka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 11/118,393

(22) Filed: May 2, 2005

(65) Prior Publication Data

US 2005/0263728 A1  Dec. 1, 2005

(30) Foreign Application Priority Data

Apr. 30, 2004  (JP)  ............................ 2004-136206

(51) Int. Cl.
- *G01N 21/86* (2006.01)
- *G01N 9/04* (2006.01)
- *G01V 8/00* (2006.01)
- *G06M 7/00* (2006.01)
- *H01J 40/14* (2006.01)

(52) U.S. Cl. ..................... 250/559.36; 250/223 R; 271/258.01; 101/247

(58) Field of Classification Search ................ 250/221, 250/223 R, 225, 559.29, 559.3, 559.33, 559.35, 250/559.36, 559.37; 271/258.01, 265.01; 101/247, 408

See application file for complete search history.

(56) References Cited

U.S. PATENT DOCUMENTS 4,805,893 A * 2/1989 Kusaka ............... 271/258.01
5,859,440 A * 1/1999 Acquaviva ........... 250/559.36

FOREIGN PATENT DOCUMENTS

JP  2002-103721 A  4/2002

* cited by examiner

Primary Examiner—Georgia Epps
Assistant Examiner—Patrick J. Lee
(74) Attorney, Agent, or Firm—Sughrue Mion, PLLC

(57) ABSTRACT

A medium detection apparatus is provided with: a light emitting section adapted to emit light; a light receiving section adapted to detect reflected light and output an output value in accordance with an amount of the reflected light; a medium supporting section adapted to support a medium and having a diffusing section adapted to diffuse the light emitted from the light emitting section; and a controller adapted to detect an edge of the medium based on a difference between the output value of the light receiving section when the light receiving section detects light reflected from the medium and the output value of the light receiving section when the light receiving section detects light reflected from the medium supporting section.

8 Claims, 13 Drawing Sheets

MEDIUM DETECTION APPARATUS AND MEDIUM DETECTION METHOD

CROSS-REFERENCE TO RELATED APPLICATIONS

The present application claims priority upon Japanese Patent Application No. 2004-136206 filed on Apr. 30, 2004, which is herein incorporated by reference.

BACKGROUND OF THE INVENTION

1. Field of the Invention

The present invention relates to medium detection apparatuses and medium detection methods.

2. Description of the Related Art

When printing is carried out on a medium using a printing apparatus, the edge of the medium is first detected with a medium detecting section of the printing apparatus. The medium detecting section has a light emitting section for emitting light, and a light receiving section for detecting reflected light and outputting an output value corresponding to the amount of reflected light. The edge of the medium is detected based on the difference between an output value of the light receiving section when it detects light reflected from the medium and an output value of the light receiving section when it detects light reflected from a medium supporting section. (See, for example, JP 2002-103721A.)

If, however, the difference between the output value of the light receiving section when it detects light reflected from the medium and the output value of the light receiving section when it detects light reflected from the medium supporting section is small, then there is a possibility that the medium detecting section cannot detect the edge of the medium accurately.

SUMMARY OF THE INVENTION

The present invention was arrived at in light of the foregoing matters, and one feature thereof is to allow a medium detecting section to detect an edge of a medium accurately.

An aspect of the present invention is a medium detection apparatus comprising: a light emitting section adapted to emit light; a light receiving section adapted to detect reflected light and output an output value in accordance with an amount of the reflected light; a medium supporting section adapted to support a medium and having a diffusing section adapted to diffuse the light emitted from the light emitting section; and a controller adapted to detect an edge of the medium based on a difference between the output value of the light receiving section when the light receiving section detects light reflected from the medium and the output value of the light receiving section when the light receiving section detects light reflected from the medium supporting section.

Other features of the present invention will become clear through the accompanying drawings and the following description.

DETAILED DESCRIPTION OF THE INVENTION

Figure 1:
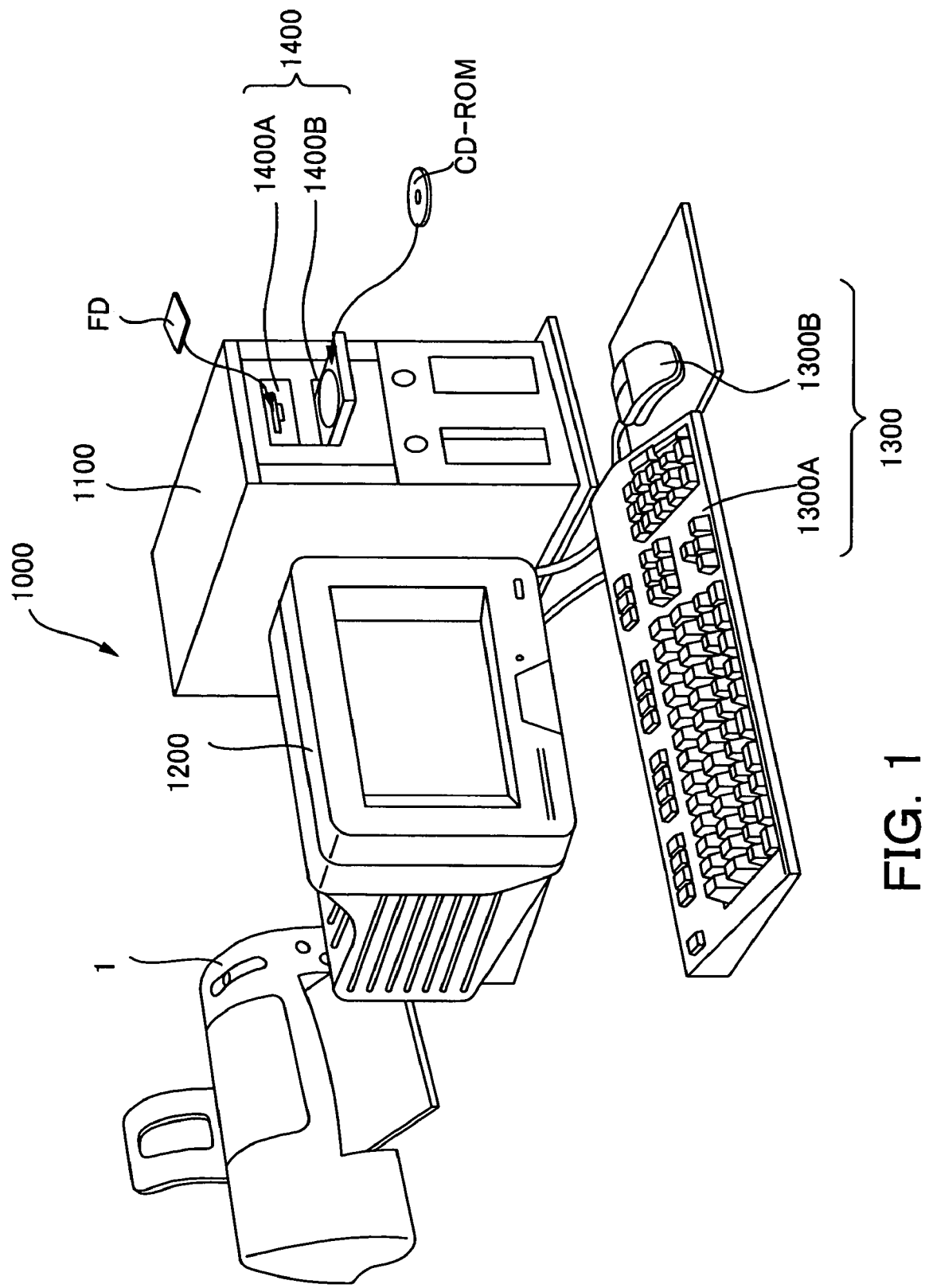
FIG. 1 is an explanatory diagram showing an external structure of a printing system.

At least the following matters will become clear by the explanation in the present specification and the description of the accompanying drawings.

A medium detection apparatus comprises: a light emitting section adapted to emit light; a light receiving section adapted to detect reflected light and output an output value in accordance with an amount of the reflected light; a medium supporting section adapted to support a medium and having a diffusing section adapted to diffuse the light emitted from the light emitting section; and a controller adapted to detect an edge of the medium based on a difference between the output value of the light receiving section when the light receiving section detects light reflected from the medium and the output value of the light receiving section when the light receiving section detects light reflected from the medium supporting section.

With this medium detection apparatus, it becomes possible to detect the edge of the medium accurately.

Further, the medium supporting section may have a contact surface that comes into contact with the medium, and a non-contact surface that does not come into contact with the medium.

With this medium detection apparatus, the medium supporting section will be provided with a contact surface that comes into contact with the medium and a non-contact surface that does not come into contact with the medium.

Further, the diffusing section may be formed at least in the contact surface.

With this medium detection apparatus, the edge of the medium can be detected accurately.

Further, the diffusing section may be formed by providing a depression and a protrusion on the contact surface and the non-contact surface; and a difference in height of the depression and the protrusion of the diffusing section formed on the contact surface may be larger than a difference in height of the depression and the protrusion of the diffusing section formed on the non-contact surface.

With this medium detection apparatus, the edge of the medium can be detected accurately even when the contact surface becomes worn due to carrying of the medium.

Further, the diffusing section may be a V-shaped groove.

With this medium detection apparatus, it is possible to diffuse the light efficiently with a simple structure.

Further, the diffusing section may be a rectangular groove.

With this medium detection apparatus, it is possible to diffuse the light efficiently with a simple structure.

Further, the groove may be formed along a direction in which the medium is carried.

With this medium detection apparatus, the medium will not get caught by the groove.

Further, at least one diffusing section may be within a range in which the light emitting section emits light.

With this medium detection apparatus, it becomes possible to detect the edge of the medium accurately.

Further, at least one diffusing section may be within a range in which the light receiving section detects the reflected light.

With this medium detection apparatus, it becomes possible to detect the edge of the medium accurately.

It is also possible to achieve a medium detection apparatus comprising: a light emitting section adapted to emit light; a light receiving section adapted to detect reflected light and output an output value in accordance with an amount of the reflected light; a medium supporting section adapted to support a medium and having a diffusing section adapted to diffuse the light emitted from the light emitting section; and a controller adapted to detect an edge of the medium based on a difference between the output value of the light receiving section when the light receiving section detects light reflected from the medium and the output value of the light receiving section when the light receiving section detects light reflected from the medium supporting section; wherein the medium supporting section has a contact surface that comes into contact with the medium, and a non-contact surface that does not come into contact with the medium; wherein the diffusing section is formed at least in the contact surface; wherein the diffusing section is formed by providing a depression and a protrusion on the contact surface and the non-contact surface, and a difference in height of the depression and the protrusion of the diffusing section formed on the contact surface is larger than a difference in height of the depression and the protrusion of the diffusing section formed on the non-contact surface; wherein the diffusing section is a V-shaped groove; wherein the groove is formed along a direction in which the medium is carried; wherein at least one diffusing section is within a range in which the light emitting section emits light; and wherein at least one diffusing section is within a range in which the light receiving section detects the reflected light.

In this way, the above-mentioned feature of the invention can be attained most effectively because all of the above-described effects can be achieved.

It is also possible to achieve a medium detection method comprising: detecting an edge of a medium based on a difference between an output value of a light receiving section when the light receiving section detects light reflected from the medium and the output value of the light receiving section when the light receiving section detects light reflected from a medium supporting section that is adapted to support the medium and that has a diffusing section adapted to diffuse the light emitted onto the medium supporting section.

A medium detection method achieved in this way becomes superior to conventional medium detection methods.

STRUCTURE OF PRINTING SYSTEMS

First, an embodiment of a printing system is described with reference to the drawings. FIG. 1 is an explanatory diagram showing the external structure of a printing system. The printing system 1000 is provided with a printer 1 which serves as a printing apparatus, a computer 1100 which serves as a print control apparatus, a display device 1200 which serves as a displaying section, an input device 1300, and a record/play device 1400.

The printer 1 is a printing apparatus for printing images on a medium such as paper S, CD-ROMs (Compact disc read-only memory) or CD-Rs (Compact disc recordable) which are examples of storage media, cloth, and film. The computer 1100 is electrically connected to the printer 1, and outputs print data corresponding to an image to be printed to the printer 1 in order to cause the printer 1 to print the image. The display device 1200 has a display and displays a user interface of, for example, an application program or a printer driver. The input device 1300 is for example a keyboard 1300A and a mouse 1300B, and is used to operate the application program or adjust the settings of the printer driver, for example, in accordance with the user interface that is displayed on the display device 1200. A flexible disk drive device 1400A and a CD-ROM drive device 1400B, for example, are employed as the record/play device 1400.

A printer driver, which serves as a print data generating section, is installed on the computer 1100. The printer driver is a program for achieving the function of displaying the user interface on the display device 1200, and in addition it also achieves the function of converting image data that have been output from the application program into print data. The printer driver is recorded on a storage medium (computer-readable storage medium) such as a flexible disk FD or a CD-ROM. Further, the printer driver can be downloaded onto the computer 1100 via the Internet. It should be noted that this program is constituted by codes for achieving the various functions.

OVERVIEW OF THE PRINTER

Structure of Inkjet Printer

Figure 2:
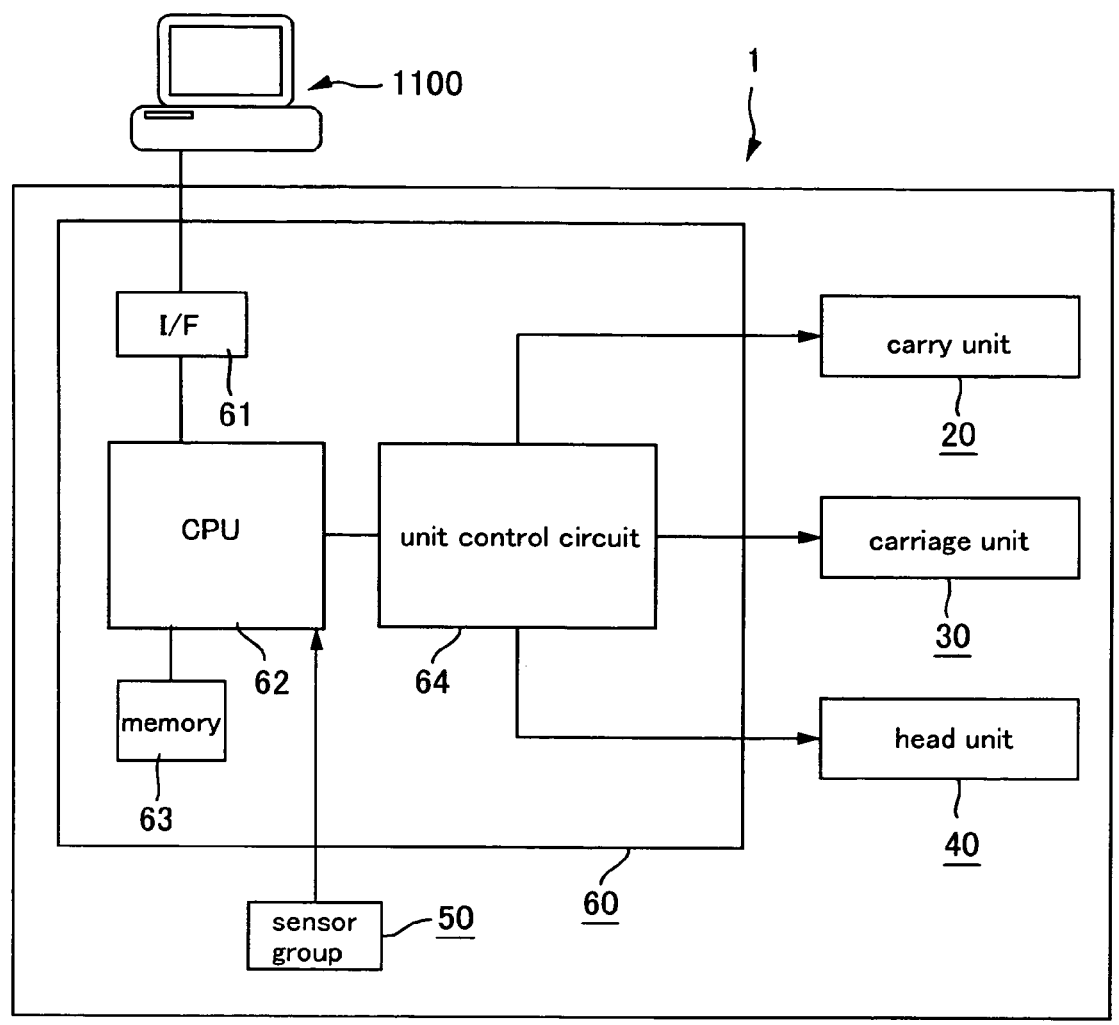
FIG. 2 is a block diagram of an overall configuration of a printer.
Figure 3:
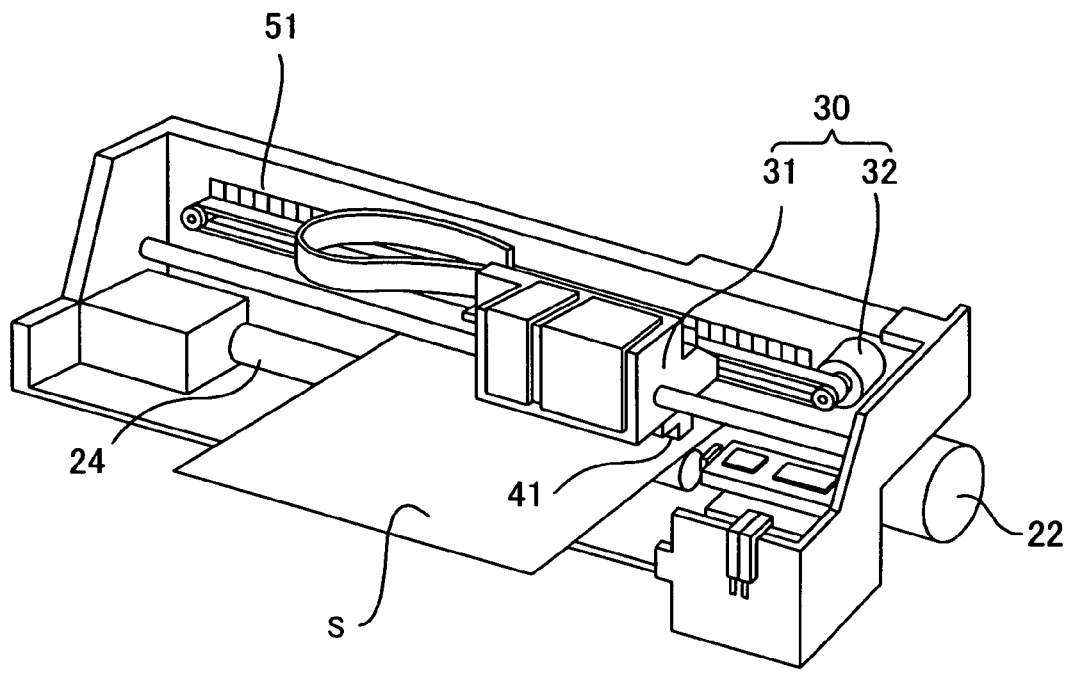
FIG. 3 is a schematic diagram of an overall structure of the printer.
Figure 3:
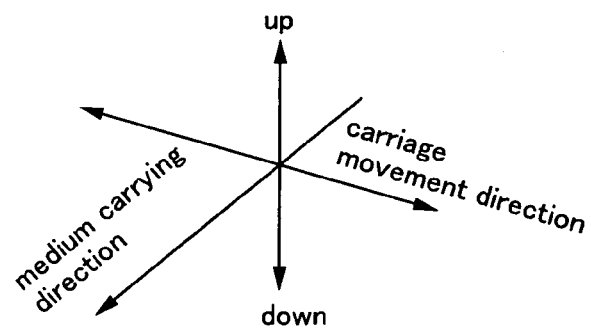
Figure 4:
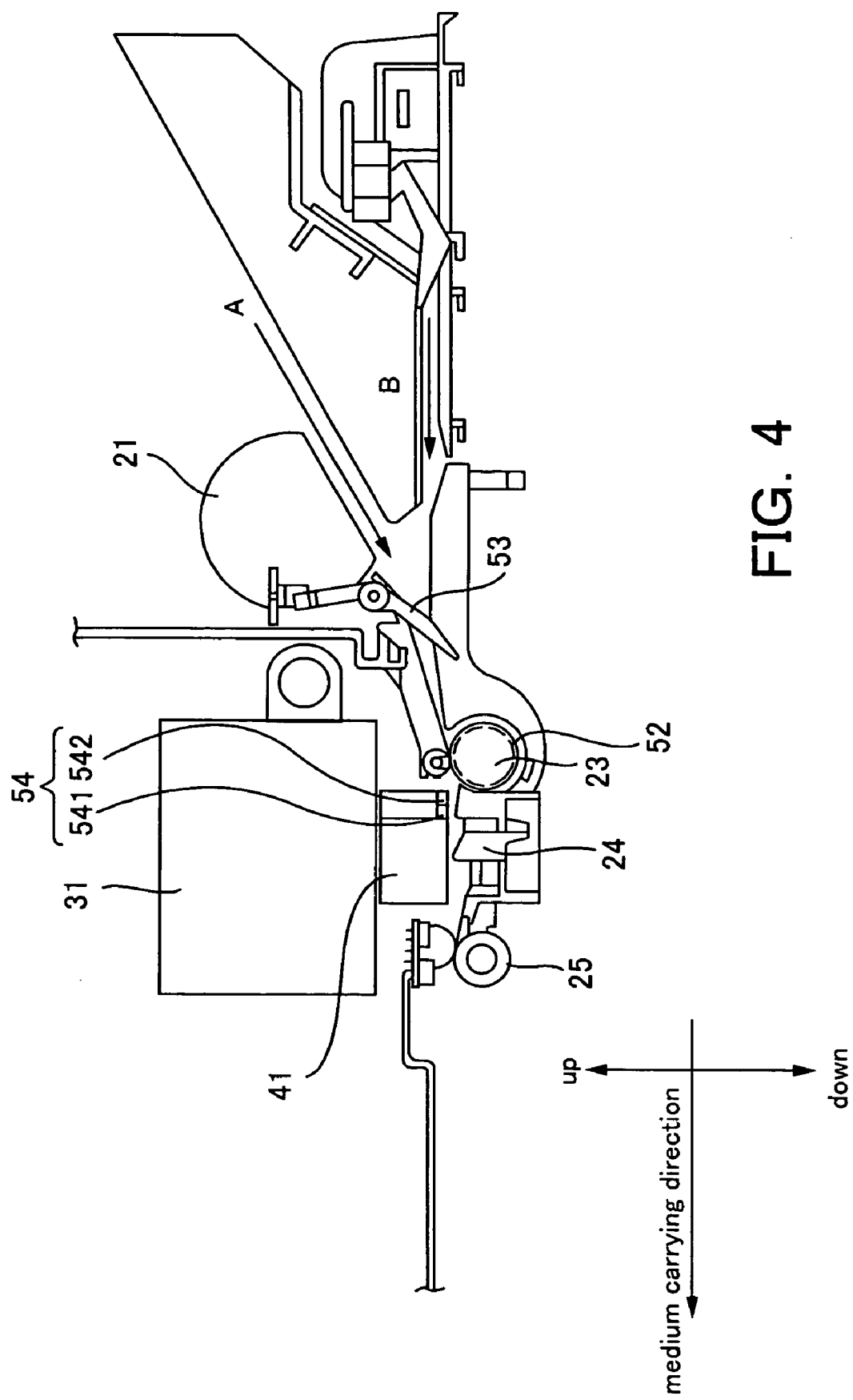
FIG. 4 is a vertical sectional view of an overall structure of the printer.

FIG. 2 is a block diagram of the overall configuration of the printer of this embodiment. FIG. 3 is a schematic diagram of the overall structure of the printer of this embodiment. FIG. 4 is a vertical sectional view of the overall structure of the printer of this embodiment. The basic structure of the printer of the present embodiment is described below.

The printer of this embodiment has a carry unit 20, a carriage unit 30, a head unit 40, a sensor group 50, and a controller 60. The printer 1 that has received print data from the computer 1100, which is an external device, controls the various units (the carry unit 20, the carriage unit 30, and the head unit 40) using the controller 60. The controller 60 controls the units in accordance with the print data that are received from the computer 1100 to form an image on paper S. The sensor group 50 monitors the conditions within the printer 1, and it outputs the results of this detection to the controller 60. The controller 60 receives the detection results from the sensor group 50, and controls the units based on these detection results.

The carry unit 20 is for feeding the paper S to a printable position and carrying the paper S in a predetermined direction (hereinafter, referred to as the carrying direction) by a predetermined carry amount during printing. In other words, the carry unit 20 functions as a carrying mechanism (carrying means) that carries the paper S. The carry unit 20 has a paper supply roller 21, a carry motor (also referred to as PF motor) 22, a carry roller 23, a platen 24, and a paper discharge roller 25. However, the carry unit 20 does not necessarily have to include all of these structural elements in order to function as a carrying mechanism.

The paper supply roller 21 is a roller for automatically supplying, into the printer, the paper S that has been inserted into the paper insert opening. The paper supply roller 21 has a transverse cross-sectional shape in the letter D, and the length of the circumference section thereof is set longer than the carrying distance to the carry roller 23, so that using this circumference section the paper S can be carried up to the carry roller 23. The carry motor 22 is a motor for carrying the paper S in the carrying direction, and is constituted by a DC motor. The carry roller 23 is a roller for carrying the paper S, which has been supplied by the paper supply roller 21, up to a printable region, and is driven by the carry motor 22. The platen 24 supports the paper S during printing. The paper discharge roller 25 is a roller for discharging the paper S for which printing has finished to the outside of the printer. The paper discharge roller 25 is rotated in synchronization with the carry roller 23.

The carriage unit 30 is for moving the head 41 in a predetermined direction. The carriage unit 30 has a carriage 31 and a carriage motor 32 (also referred to as "CR motor"). The carriage 31 is capable of moving back and forth in a carriage movement direction (and thus the head 41 moves in the carriage movement direction which is the predetermined direction). Further, the carriage 31 detachably holds ink cartridges that contain ink. The carriage motor 32 is a motor for moving the carriage 31 in the carriage movement direction, and is constituted by a DC motor.

The head unit 40 is for ejecting ink onto the paper S. The head unit 40 has a head 41. The head 41 has a plurality of nozzles, which serve as the ink ejecting sections, and intermittently ejects ink from the nozzles. The head 41 is provided in the carriage 31. Thus, when the carriage 31 moves in the carriage movement direction, the head 41 also moves in the carriage movement direction. Dot lines (raster lines) are formed on the paper S in the carriage movement direction due to the head 41 intermittently ejecting ink while moving in the carriage movement direction.

The sensor group 50 includes a linear encoder 51, a rotary encoder 52, a paper detection sensor 53, and an optical sensor 54. The linear encoder 51 is for detecting the position of the carriage 31 in the carriage movement direction. The rotary encoder 52 is for detecting the amount of rotation of the carry roller 23.

The paper detection sensor 53 is for detecting the position of the front end of the paper S being printed. The paper detection sensor 53 is provided in a position where it can detect the position of the front end of the paper S as the paper S is being fed toward the carry roller 23 by the paper supply roller 21. It should be noted that the paper detection sensor 53 is a mechanical sensor that detects the front end of the paper S via a mechanical mechanism. More specifically, the paper detection sensor 53 has a lever that can be rotated in the carrying direction, and this lever is disposed so that it protrudes into the path over which the paper S is carried. Thus, the front end of the paper S comes into contact with the lever and rotates the lever, and thus the paper detection sensor 53 detects the position of the front end of the paper S by detecting the movement of the lever.

The optical sensor 54 is attached to the carriage 31, and is provided with a light emitting section 541 and a light receiving section 542. The optical sensor 54 detects whether or not the paper S is present by detecting, with its light receiving section 542, the reflected light of the light that has been irradiated onto the paper S from its light emitting section 541. The optical sensor 54 detects the positions of the edges of the paper S while being moved by the carriage 31. Because the optical sensor 54 detects the edges of the paper S optically, its detection precision is higher than the mechanical paper detection sensor 53.

The controller 60 is a control unit (control means) for carrying out control of the printer. The controller 60 has an interface section 61, a CPU 62, a memory 63, and a unit control circuit 64.

The interface section 61 exchanges data between the computer 1100, which is an external device, and the printer 1. The CPU 62 is a computer processing device for executing overall control of the printer. The memory 63 is for securing a working region and a region for storing the programs for the CPU 62, for instance, and includes memory means such as a RAM or an EEPROM. The CPU 62 controls the various units through the unit control circuit 64 according to the programs stored on the memory 63.

<Detecting Edge of Medium with Optical Sensor 54>

Figure 5A:
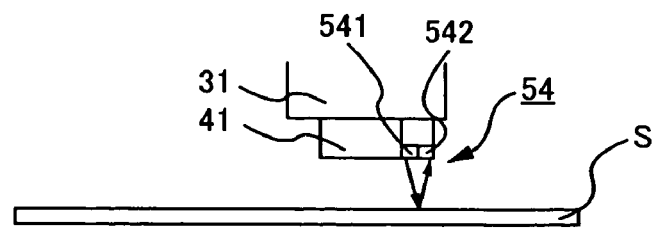
FIG. 5A is an explanatory diagram that shows the state in which an optical sensor 54 detects the edge of a paper S while moving along with the movement of a carriage 31.
Figure 5B:
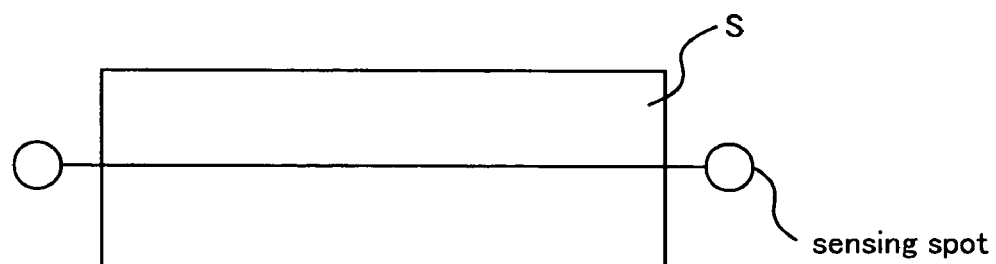
FIG. 5B is an explanatory diagram showing the change in the output value of a light receiving section 542 as the optical sensor 54 moves along with the carriage 31.
Figure 5B:
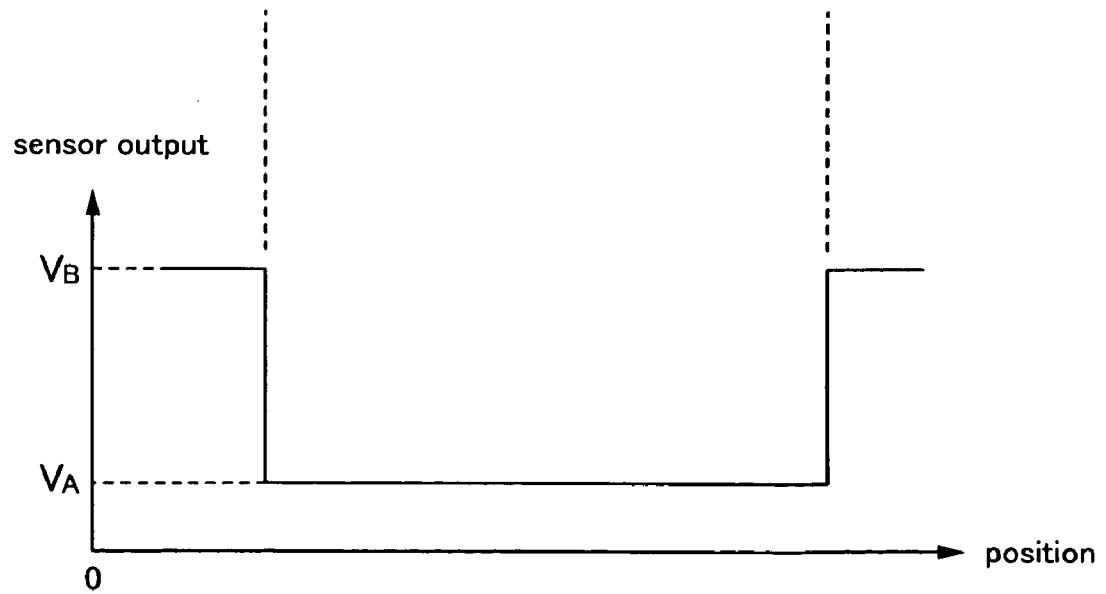

Next, detection of the edge of the medium with the optical sensor 54 is described with reference to FIGS. 5A and 5B. FIG. 5A is an explanatory diagram that shows the state in which the optical sensor 54 detects the edge of the paper S while moving. FIG. 5B is an explanatory diagram showing the change in the output value of the light receiving section 542 as the optical sensor 54 moves.

As shown in FIG. 5A, the optical sensor 54 emits light from its light emitting section 541, and receives the reflected light with its light receiving section 542. The optical sensor 54 moves with the movement of the carriage 31. With the movement of the carriage 31, the sensing spot (detection spot) of the optical sensor 54 can pass across the paper S. The output value of the light receiving section 542 when the optical sensor 54 passes across the paper S changes as shown in FIG. 5B. When the sensing spot of the optical sensor 54 is positioned outside the paper S, the light emitting section 541 emits light onto the platen, and the light receiving section 542 detects the light reflected from the platen. On the other hand, when the sensing spot of the optical sensor 54 is positioned on the paper S, the light emitting section 541 emits light onto the paper S, and the light receiving section 542 detects the light reflected from the paper.

The light receiving section 542 of the optical sensor 54 of the present embodiment outputs an output value that is lower the larger the amount of received light is. The amount of light reflected from the paper S is larger than the amount of light reflected from the platen. Therefore, the output value $V_A$ of the light receiving section 542 when it receives light reflected from the paper S becomes smaller than the output value $V_B$ of the light receiving section 542 when it receives light reflected from a member other than the paper S. The controller 60 can detect the position of the edge of the paper S by detecting the position at which the output value of the light receiving section 542 changes greatly during movement of the optical sensor 54.

<Structure of Platen 24 According to Reference Example>

Figure 6:
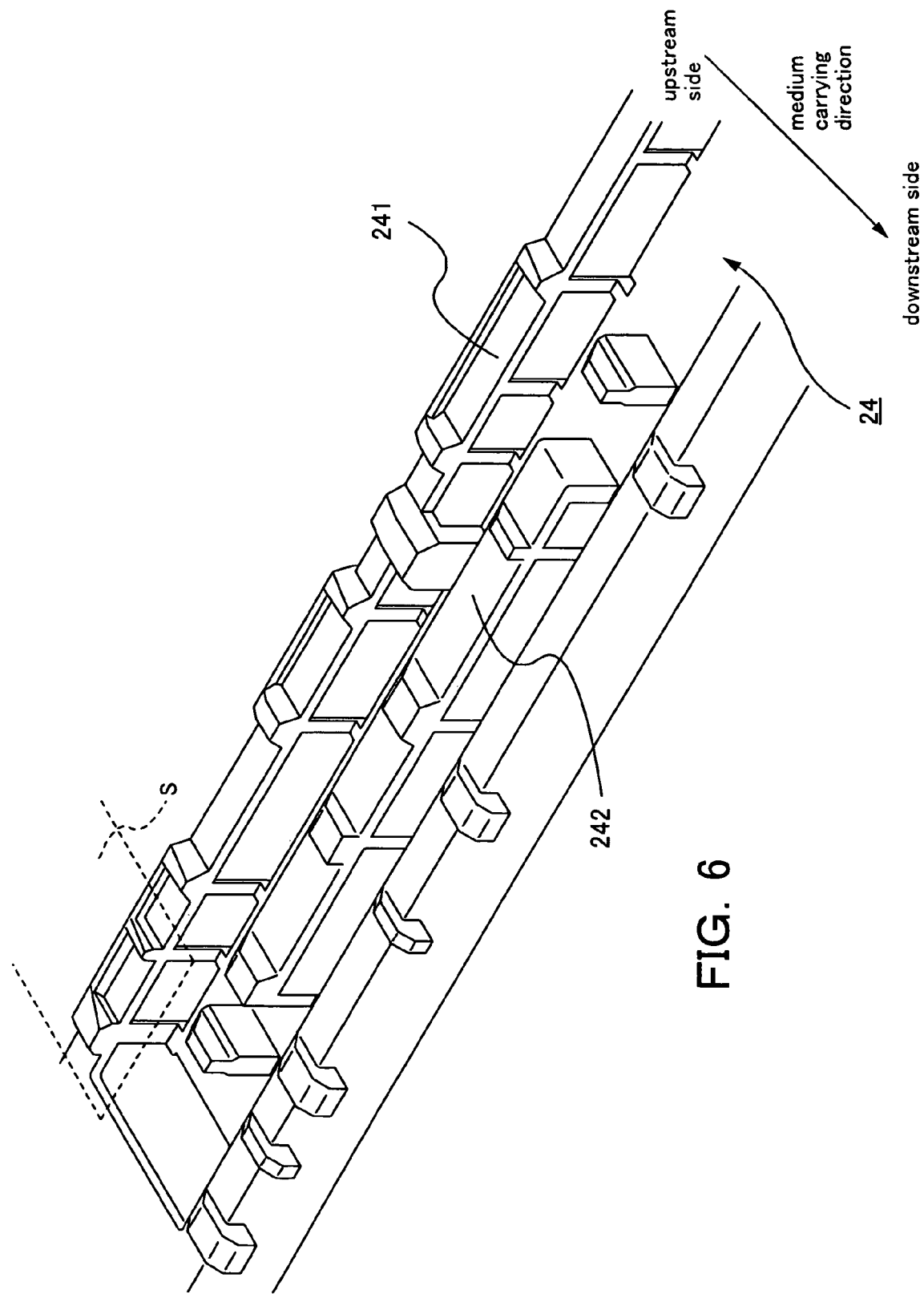
FIG. 6 is an explanatory diagram showing a structure of a conventional platen 24.

FIG. 6 is an explanatory diagram showing the structure of a platen 24 according to a reference example. The platen 24 includes a medium supporting section 241 provided on the upstream side in the medium carrying direction, and a medium supporting section 242 provided on the downstream side in the medium carrying direction. In the example shown in FIG. 6, the paper S is being supported by the medium supporting section 241 provided on the upstream side in the medium carrying direction.

<Detecting Edge of Medium with Optical Sensor 54 when using Platen 24 of Reference Example>

Figure 7:
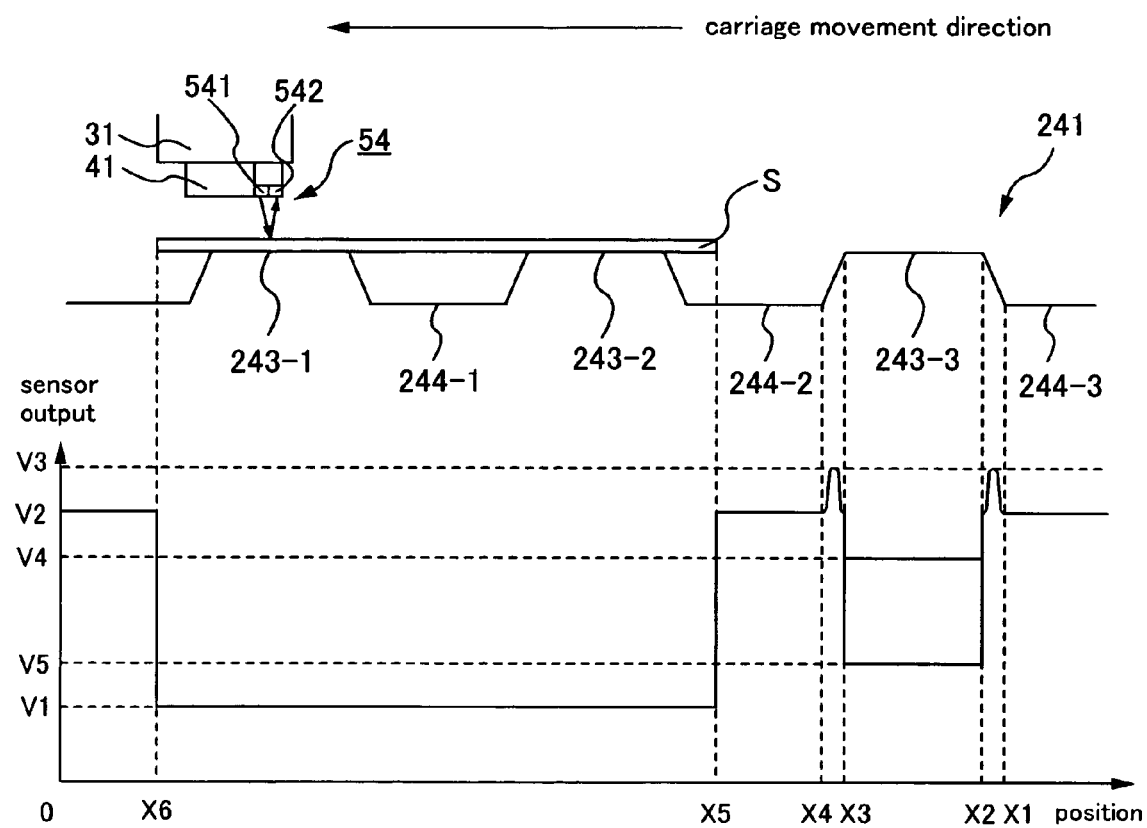
FIG. 7 is an explanatory diagram showing how the optical sensor 54 detects the edge of the medium when the platen 24 of the conventional type is used.

FIG. 7 is an explanatory diagram showing how the optical sensor 54 detects the edge of the medium when the platen 24 of the reference example is used.

Of the platen 24, the medium supporting section 241 provided on the upstream side in the medium carrying direction is shown in the example shown in FIG. 7. Contact surfaces 243-n (n=1, 2, ...) that come into contact with the paper S and non-contact surfaces 244-n (n=1, 2, ...) that do not come into contact with the paper S are connected alternately, thereby forming the medium supporting section 241. In the example shown in FIG. 7, the carriage 31 moves in the direction (toward the left) shown by the arrow in the figure.

Next, description will be made of how the output value of the light receiving section 542 changes when the carriage 31 moves toward the left. The output becomes V2 when the light receiving section 542 receives light reflected from the non-contact surface 244-3. Then, the output of the light receiving section 542 when the light receiving section 542 is moved toward the left along with the movement of the carriage 31 and the light receiving section 542 receives light reflected from a range from position X1 to position X2 is as shown in the figure. More specifically, from position X1 to around the midpoint between position X1 and position X2, the output of the light receiving section 542 changes from V2 to V3, and then, from around the midpoint between position X1 and position X2 to position X2, the output of the light receiving section 542 changes from V3 to V2. The reason why the output of the light receiving section 542 becomes larger than V2 from position X1 to position X2 is as follows. Position X1 is at the left edge of the non-contact surface 244-3, and position X2 is at the right edge of the contact surface 243-3. The area from position X1 to position X2 is connected by an oblique surface. Therefore, the amount of reflected light received by the light receiving section 542 from position X1 to position X2 becomes small. Thus, the output of the light receiving section 542 becomes larger than V2 from position X1 to position X2.

Then, the output of the light receiving section 542 becomes V4 when the light receiving section 542 is moved further toward the left along with the movement of the carriage 31 and the light receiving section 542 receives light reflected from a range from position X2 to position X3. The reason why the output V4 of the light receiving section 542 from position X2 to position X3 becomes smaller than V2 is as follows. The range from position X2 to position X3 corresponds to the range from the right edge to the left edge of the contact surface 243-3. The distance between the contact surface 243-3 and the light emitting section 541 is smaller than the distance between the non-contact surface 244-3 and the light emitting section 541. Therefore, the amount of light received by the light receiving section 542 is larger for the light reflected from the contact surface 243-3, which is at a shorter distance from the light emitting section 541, than the light reflected from the non-contact surface 244-3. Therefore, the output V4 of the light receiving section 542 when it receives the light reflected from the range from position X2 to position X3 becomes smaller than V2.

Then, the output of the light receiving section 542 when the light receiving section 542 is moved further toward the left along with the movement of the carriage 31 and the light receiving section 542 receives light reflected from a range from position X3 to position X4 is as shown in the figure. More specifically, from position X3 to around the midpoint between position X3 and position X4, the output of the light receiving section 542 changes from V2 to V3, and then, from around the midpoint between position X3 and position X4 to position X4, the output of the light receiving section 542 changes from V3 to V2. The reason why the output of the light receiving section 542 from position X3 to position X4 becomes larger than V2 is the same as the reason why the output of the light receiving section 542 from position X1 to position X2 becomes larger than V2, and therefore, description thereof is omitted because it would be repetitious.

Then, the output of the light receiving section 542 becomes V2 when the light receiving section 542 is moved further toward the left along with the movement of the carriage 31 and the light receiving section 542 receives light reflected from a range from position X4 to position X5.

Then, the output of the light receiving section 542 becomes V1 when the light receiving section 542 is moved further toward the left along with the movement of the carriage 31 and the light receiving section 542 receives light reflected from a range from position X5 to position X6. Position X5 corresponds to the right edge of the paper S, and position X6 corresponds to the left edge of the paper S. Therefore, the light reflected from the range from position X5 to position X6 is light reflected from the paper S. The surface of the paper S tends to reflect more light than the contact surface 243-3. Therefore, the output V1 of the light receiving section 542 when it receives the light reflected from the range from position X5 to position X6 becomes smaller than the output V2 of the light receiving section 542 when it receives the light reflected from the non-contact surface 244-2.

Then, the output of the light receiving section 542 becomes V2 when the light receiving section 542 is moved further toward the left along with the movement of the carriage 31 and the light receiving section 542 receives light reflected from a range to the left of position X6.

As described above, the output V1 of the light receiving section 542 when it receives the light reflected from the paper S is smaller than the output V2 of the light receiving section 542 when it receives the light reflected from the non-contact surface 244-2 (or −3) and also the output V4 of the light receiving section 542 when it receives the light reflected from the contact surface 243-3.

Therefore, by setting a threshold value between V1 and V4, the controller 60 can determine that the edge of the paper S has been detected when the output of the light receiving section 542 becomes smaller than the threshold value.

Incidentally, there are situations in which grease etc. applied to gears in various sections of the printer 1 adheres to the contact surface 243-3. In such a case, the grease etc. will reflect the light emitted from the light emitting section 541 at a stronger intensity. Therefore, the light receiving section 542 receives a larger amount of light than when the grease etc. is not on the contact surface 243-3. The output of the light receiving section 542 in this case therefore becomes smaller (V5) than the output (V4) for when the grease etc. is not on the contact surface 243-3.

For this reason, it becomes necessary to set the threshold value between V1 and V5 in order for the optical sensor 54 to be able to detect the edge of the paper S even when grease is adhering to the contact surface 243-3. The voltage difference between V1 and V5, however, is smaller than the voltage difference between V1 and V4. Therefore, the flexibility in design for setting the threshold value becomes low. If, however, the threshold is set to a value higher than V5, then the controller 60 may erroneously detect, as the edge of the paper S, a position that is actually not the edge when grease is adhering to the contact surface 243-3.

<Structure of Platen 24 According to Present Embodiment>

According to the present embodiment, grooves (diffusing section) for diffusing the light emitted from the light emitting section 541 are provided in the platen 24, as described below.

Figure 8:
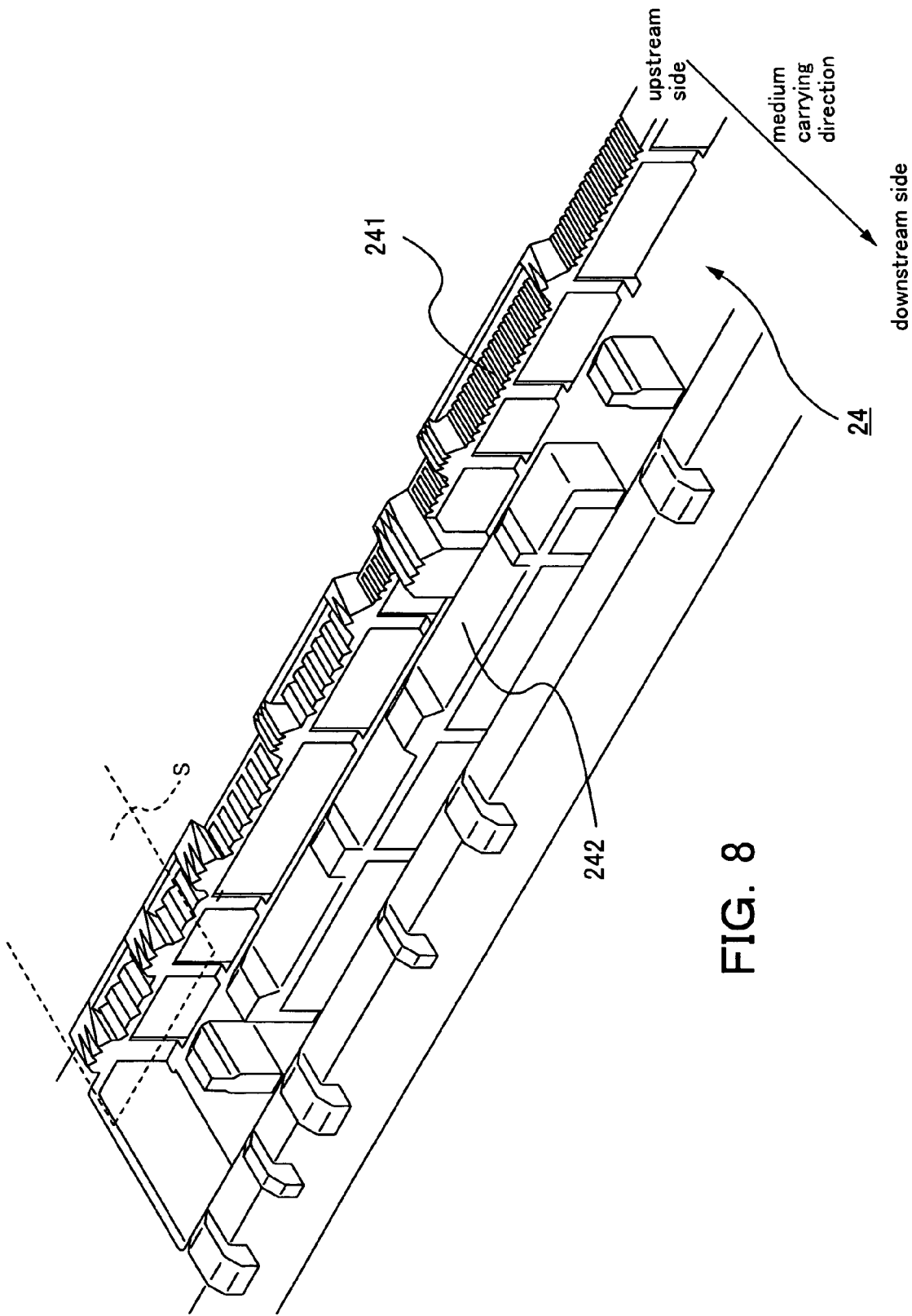
FIG. 8 is an explanatory diagram showing a structure of a platen 24 according to the present embodiment.

FIG. 8 is an explanatory diagram showing the structure of a platen 24 according to the present embodiment. The platen 24 includes a medium supporting section 241 provided on the upstream side in the medium carrying direction, and a medium supporting section 242 provided on the downstream side in the medium carrying direction. The medium supporting section 241 provided on the upstream side in the medium carrying direction is positioned in opposition to the optical sensor 54 provided on the carriage. The medium supporting section 241 is provided with a plurality of grooves, as diffusing sections, for diffusing the light emitted from the light emitting section 541. The structure of the grooves will be described in detail further below with reference to FIG. 10.

<Relationship between Optical Sensor 54 and Grooves according to Present Embodiment>

Figure 9:
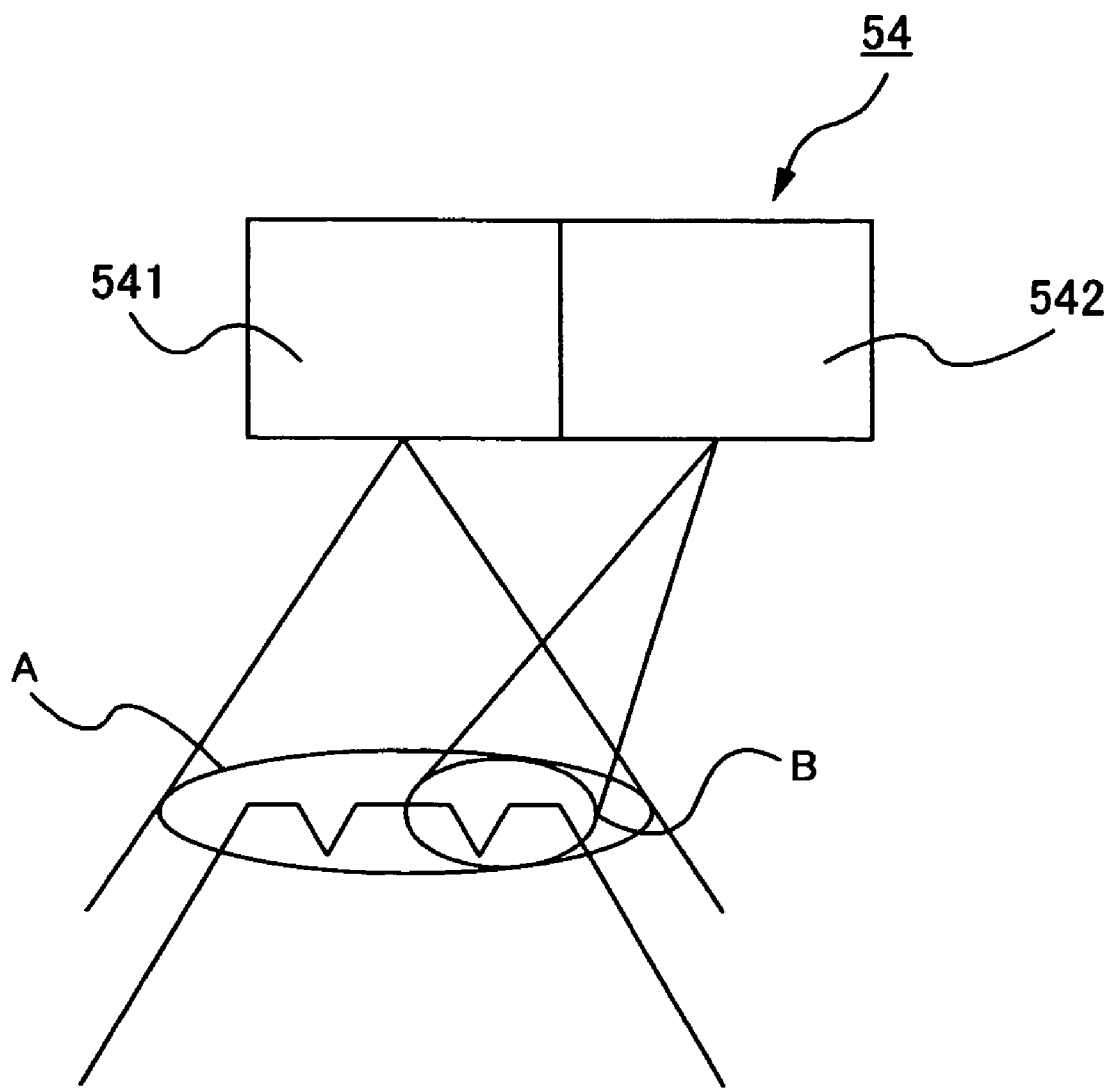
FIG. 9 is an explanatory diagram showing a relationship between the optical sensor 54 and the grooves.

FIG. 9 is an explanatory diagram showing a relationship between the optical sensor 54 and the grooves. In the example shown in FIG. 9, one of the contact surfaces 243-n (n=1, 2, ... ) is shown. The width of the contact surface is approximately 2 mm. The diameter of the spot (the range labeled A in the figure) where the light emitted from the light emitting section 541 is irradiated onto the contact surface is approximately 3 mm. The range in which the light receiving section 542 detects the reflected light, of all the light reflected from the contact surface, is the range labeled B in the figure. As shown in FIG. 9, the range in which the light receiving section 542 detects the reflected light includes at least one groove for diffusing light. Therefore, when there are grooves in the contact surface, the amount of reflected light that is received by the light receiving section 542 becomes smaller compared to a case in which there are no grooves. Thus, the output of the light receiving section 542 becomes larger for the case in which there are grooves in the contact surface compared to a case in which there are not grooves.

<Detecting Edge of Medium With Optical Sensor 54 When Using Platen 24 of Present Embodiment>

Figure 10:
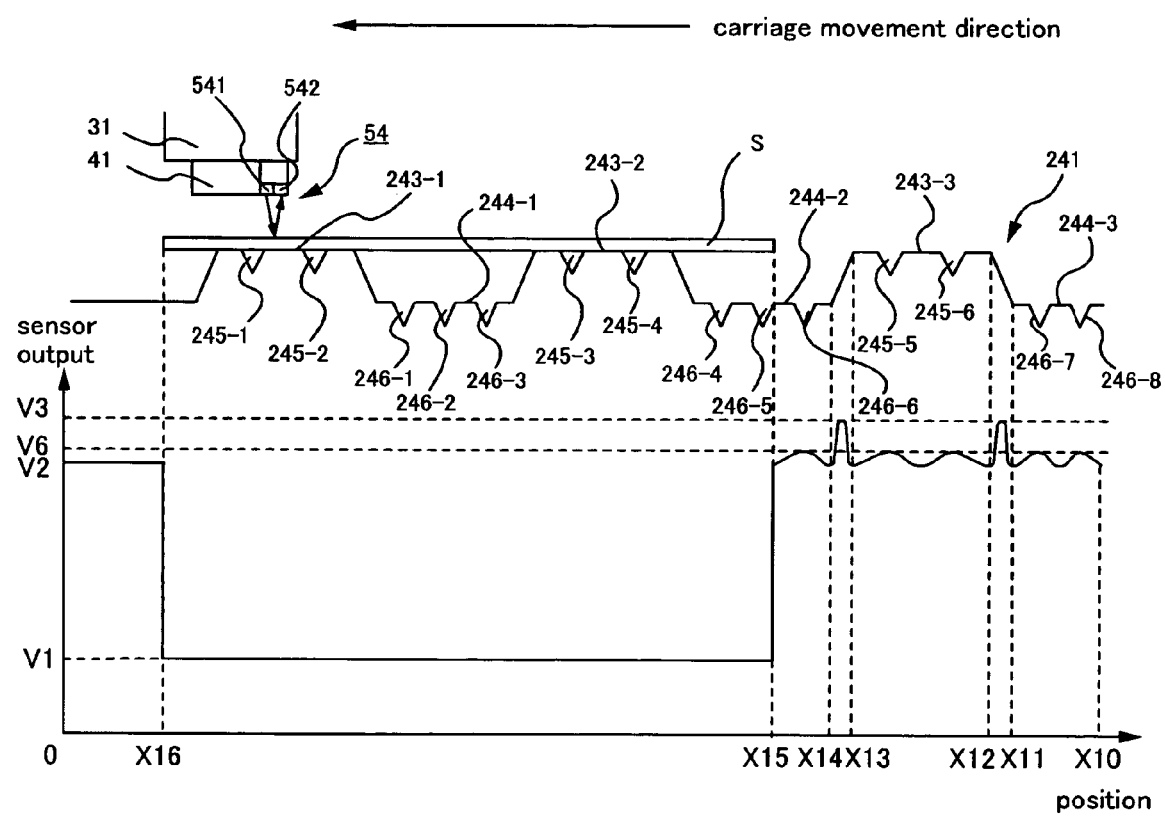
FIG. 10 is an explanatory diagram showing how the optical sensor 54 detects the edge of the medium when the platen 24 of the present embodiment is used.

FIG. 10 is an explanatory diagram showing how the optical sensor 54 detects the edge of the medium when the platen 24 of the present embodiment is used.

Of the platen 24, the medium supporting section 241 provided on the upstream side in the medium carrying direction is shown in the example shown in FIG. 10. Contact surfaces 243-n (n=1, 2, ... ) that come into contact with the paper S and non-contact surfaces 244-n (n=1, 2, ... ) that do not come into contact with the paper S are connected alternately, thereby forming the medium supporting section 241.

The non-contact surfaces 244-n (n=1, 2, ... ) are formed in the medium supporting section 241 in order to relieve warping in the paper S and prevent the paper S from rising up from the platen 24. If no non-contact surface were provided, then the side edges of the paper S would rise up from the platen 24. Further, if no non-contact surface were provided, then the central section of the paper S would rise up from the platen 24 in case the paper surface becomes wavy (cockled or wrinkled) due to absorption of ink. In contrast, in the example shown in FIG. 10, the side edges of the paper S (the left and right edges of the paper S in the figure) are positioned above the non-contact surfaces 244-n, so that the left and right edges of the paper S bend downward (toward the non-contact surfaces 244-n) and the side edges of the paper S do not rise up. It should be noted that since paper S of standard sizes (such as A4 size etc.) is normally used, it is preferable that the non-contact surfaces 244-n are formed in the medium supporting section 241 such that the side edges of the standard-sized paper come above the non-contact surfaces 244-n. Further, in the example shown in FIG. 10, a portion of the central section of the paper S is positioned above the non-contact surface 244-n, so that the central section of the paper S bends downward (toward the non-contact surface 244-n) and the central section of the paper S does not rise up in case the paper surface becomes wavy due to absorption of ink.

In each contact surface 243-n (n=1, 2, ... ) are formed two V-shaped grooves 245-n (n=1, 2, ... ) leaving a predetermined spacing (for example, 0.5 mm) between them. In each non-contact surface 244-n (n=1, 2, ... ) are formed three V-shaped grooves 246-n (n=1, 2, ... ) leaving a predetermined spacing (for example, 0.5 mm) between them. The reason why these grooves 245-n (n=1, 2, ... ) and grooves 246-n (n=1, 2, ... ) are formed along the carrying direction is because if the grooves were to be formed along the carriage movement direction, then the paper S would get caught by the grooves when being carried.

Further, in the example shown in FIG. 10, the carriage 31 moves in the direction (toward the left) shown by the arrow in the figure.

Next, description will be made of how the output value of the light receiving section 542 changes when the carriage 31 moves toward the left.

The output of the light receiving section 542 when the light receiving section 542 is moved toward the left along with the movement of the carriage 31 and the light receiving section 542 receives light reflected from a range from position X10 to position X11 is as shown in the figure. More specifically, the output of the light receiving section 542 becomes V6, which is an output that is larger than V2, when the light receiving section 542 receives light reflected from around the top of the V-shaped grooves. This is because the light emitted from the light emitting section 541 is diffused by the V-shaped grooves and the amount of light reflected from the vicinity of the V-shaped grooves becomes smaller than the amount of light reflected from a flat section.

Then, the output of the light receiving section 542 when the light receiving section 542 is moved further toward the left along with the movement of the carriage 31 and the light receiving section 542 receives light reflected from a range from position X11 to position X12 is as shown in the figure.

From position X11 to around the midpoint between position X11 and position X12, the output of the light receiving section 542 changes from V2 to V3, and then, from around the midpoint between position X1 and position X12 to position X12, the output of the light receiving section 542 changes from V3 to V2. The reason why the output of the light receiving section 542 from position X11 to position X12 becomes larger than V2 is the same as the reason why the output of the light receiving section 542 from position X1 to position X2 shown in FIG. 7 becomes larger than V2, and therefore, description thereof is omitted because it would be repetitious.

Then, the output of the light receiving section 542 when the light receiving section 542 is moved further toward the left along with the movement of the carriage 31 and the light receiving section 542 receives light reflected from a range from position X12 to position X13 is as shown in the figure. More specifically, the output of the light receiving section 542 becomes V6, which is an output that is larger than V2, when the light receiving section 542 receives light reflected from around the top of the V-shaped grooves. This is because the light emitted from the light emitting section 541 is diffused by the V-shaped grooves and the amount of reflected light received by the light receiving section 542 becomes small.

Then, the output of the light receiving section 542 when the light receiving section 542 is moved further toward the left along with the movement of the carriage 31 and the light receiving section 542 receives light reflected from a range from position X13 to position X14 is as shown in the figure. The reason to this is the same as the reason given in the description about the output of the light receiving section 542 when it receives the light reflected from the range from position X1 to position X12, and therefore, description thereof is omitted because it would be repetitious.

Then, the output of the light receiving section 542 when the light receiving section 542 is moved further toward the left along with the movement of the carriage 31 and the light receiving section 542 receives light reflected from a range from position X14 to position X15 is as shown in the figure. More specifically, the output of the light receiving section 542 becomes V6, which is an output that is larger than V2, when the light receiving section 542 receives light reflected from around the top of the V-shaped grooves.

Then, the output of the light receiving section 542 becomes V1 when the light receiving section 542 is moved further toward the left along with the movement of the carriage 31 and the light receiving section 542 receives light reflected from a range from position X15 to position X16. Position X15 corresponds to the right edge of the paper S, and position X16 corresponds to the left edge of the paper S. Therefore, the light reflected from the range from position X15 to position X16 is light reflected from the paper S. The surface of the paper S is apt to reflect light, and therefore, the output V1 of the light receiving section 542 when it receives the light reflected from the range from position X15 to position X16 becomes smaller than the output V2.

Then, the output of the light receiving section 542 becomes V2 when the light receiving section 542 is moved further toward the left along with the movement of the carriage 31 and the light receiving section 542 receives light reflected from a range to the left of position X16.

As described above, in the present embodiment, a plurality of V-shaped grooves are formed in each of the contact surfaces 243-n (n=1, 2, . . . ) and the non-contact surfaces 244-n (n=1, 2, . . . ) of the medium supporting section 241. The light that is emitted from the light emitting section 541 is diffused by the V-shaped grooves. Further, as shown in FIG. 9, at least one V-shaped groove is within the range in which the light receiving section 542 detects the reflected light. Therefore, according to the present embodiment, the amount of light reflected from the vicinity of the V-shaped grooves becomes smaller than the amount of light reflected from a flat section as in the reference example. Thus, when the sensing spot of the optical sensor 54 is positioned outside the paper S, the amount of light received by the light receiving section 542 of the present embodiment becomes smaller than that of the reference example. Particularly, when the sensing spot of the optical sensor 54 is on the contact surface 243-n of the platen 24, the amount of light received by the light receiving section 542 of the present embodiment becomes smaller than that of the reference example.

Thus, according to the present embodiment, the difference between the output value of the light receiving section 542 when the sensing spot of the optical sensor 54 is on the paper S and the output value of the light receiving section 542 when the sensing spot of the optical sensor 54 is outside the paper S becomes large. Therefore, the range in which to set the threshold value for detecting the edge of the paper S does not have to be made small, and the flexibility in design for setting the threshold value can be enhanced. Further, the controller 60 can detect the edge of the paper S accurately.

Even if, for example, grease etc. adheres to the contact surfaces 243-n (n=1, 2, . . . ) and the non-contact surfaces 244-n (n=1, 2, . . . ), the output of the light receiving section 542 will not become as small as V5 shown in FIG. 7. According to the present embodiment, the threshold value for detecting the edge of the paper S will be set within a range that is wider than the range between V1 and V5, even when grease etc. is adhering to the contact surfaces 243-n (n=1, 2, . . . ) and the non-contact surfaces 244-n (n=1, 2, . . . ). Therefore, the controller 60 can detect the edge of the paper S more accurately.

<Detecting Edge of Medium With Optical Sensor 54 When the Shape of Grooves in Medium Supporting Section 241 is Different From the Shape Shown in FIG. 10>

Figure 11:
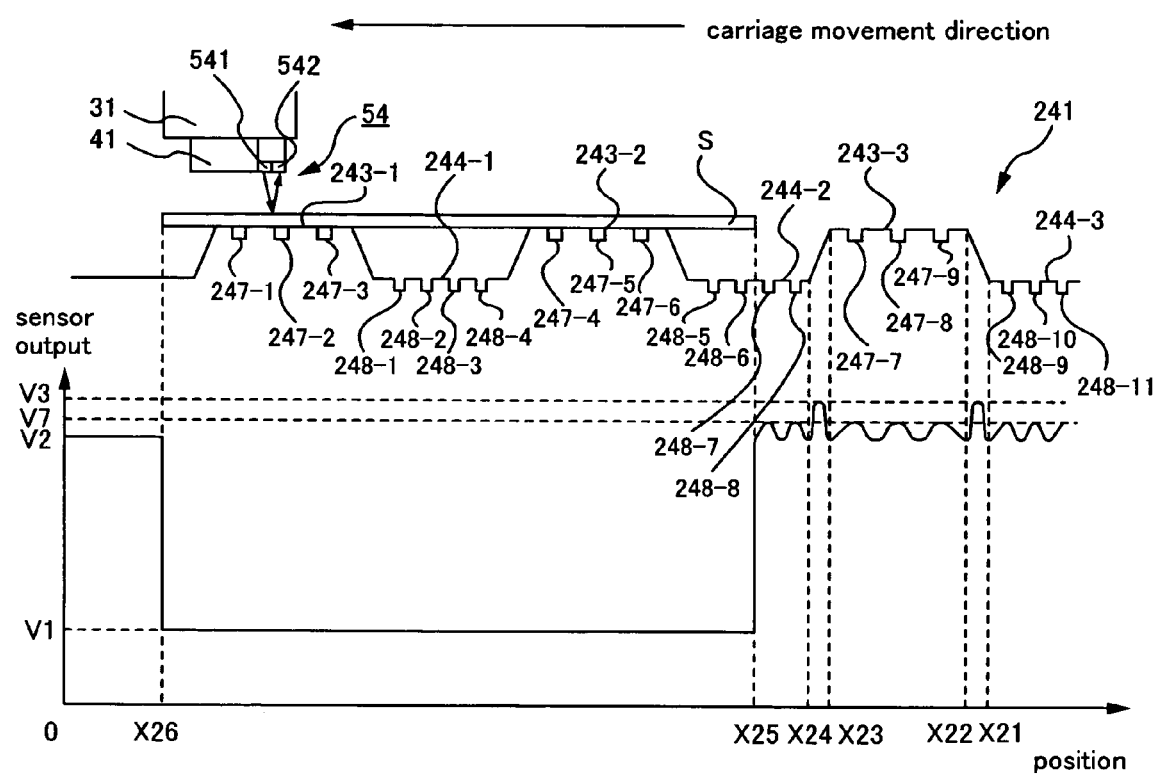
FIG. 11 is an explanatory diagram of detecting the edge of the medium with the optical sensor 54 when the shape of the grooves is different.

FIG. 11 is an explanatory diagram of detecting the edge of the medium with the optical sensor 54 when the shape of the grooves provided in the medium supporting section 241 is different from the shape shown in FIG. 10.

In the example shown in FIG. 11, in each contact surface 243-n (n=1, 2, . . . ) are formed three rectangular grooves 247-n (n=1, 2, . . . ) leaving a predetermined spacing (for example, 0.3 mm) between them. In each non-contact surface 244-n (n=1, 2, . . . ) are formed four rectangular grooves 248-n (n=1, 2, . . . ) leaving a predetermined spacing (for example, 0.3 mm) between them. The output value of the light receiving section 542 when the carriage 31 moves in the direction (toward the left) shown in the figure by the arrow is as shown in the figure.

As can be seen, even when the shape of the diffusing section is rectangular, the amount of light reflected from the contact surface 243-n becomes small compared to the reference example, because the emitted light is diffused. Thus, the output of the light receiving section 542 when it receives the light reflected from the vicinity of the rectangular grooves becomes larger than the output of the light receiving section 542 of the reference example. Therefore, the range in which to set the threshold value for detecting the edge of the paper S does not have to be narrowed down.

OTHER EMBODIMENTS

A medium detection apparatus etc. according to the present invention was described through the above embodiments. However, the foregoing embodiments are for the purpose of elucidating the present invention and are not to be interpreted as limiting the present invention. The invention can of course be altered and improved without departing from the gist thereof and includes equivalents.

In the foregoing embodiment, the shape of the diffusing section was V-shaped or rectangular. The shape of the diffusing section, however, is not limited to the V-shape or a rectangle. Other shapes can be adopted as well, as long as the light emitted from the light emitting section 541 can be diffused.

Figure 12:
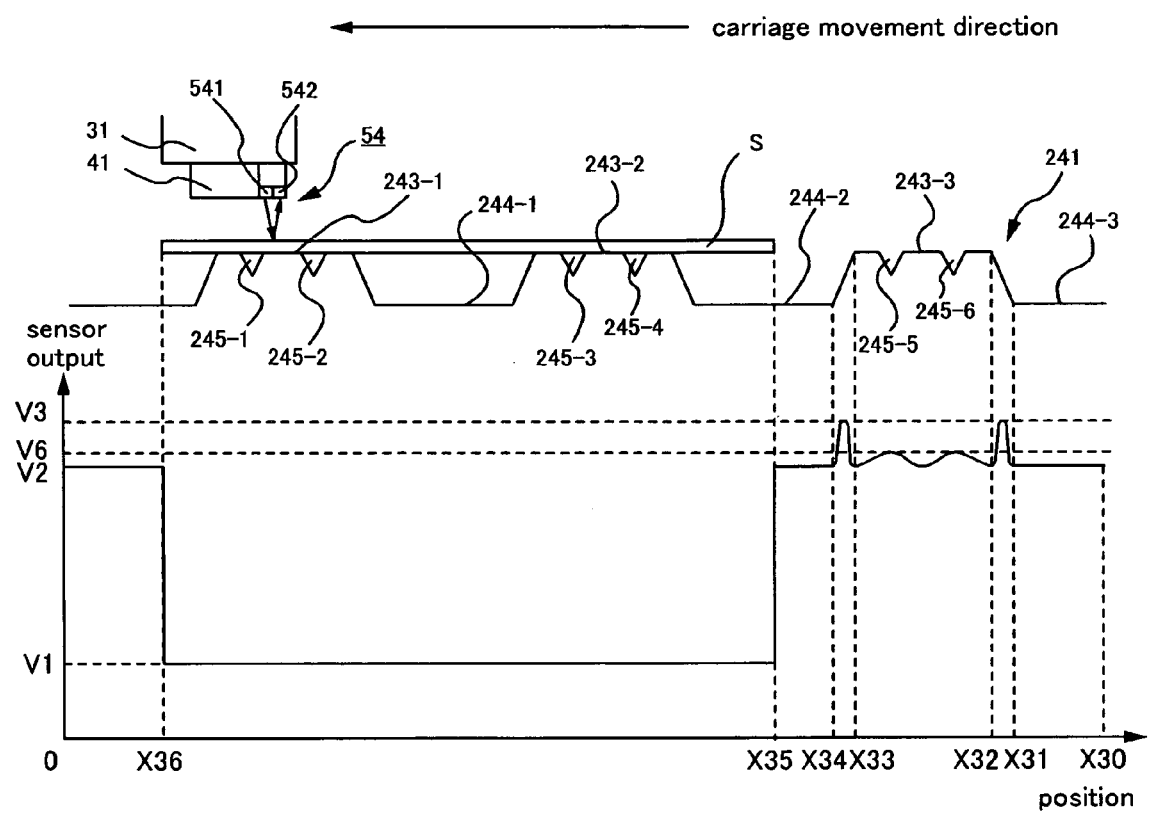
FIG. 12 is an explanatory diagram showing an example in which V-shaped grooves are provided only in the contact surfaces 243-n of the medium supporting section 241.

Further, in the foregoing embodiment, V-shaped or rectangular grooves were provided in both the contact surfaces 243-n (n=1, 2, . . . ) and the non-contact surfaces 244-n (n=1, 2, . . . ). However, as shown in FIG. 12, the grooves may be provided only in the contact surfaces 243-n (n=1, 2, . . . ). The distance between the contact surface 243-n and the optical sensor 54 is small, and therefore, if the contact surface 243-n is flat as in the reference example, the output value of the light receiving section 542 tends to become low and thus detection errors tend to occur. By providing grooves in such a contact surface 243-n, the amount of light reflected toward the light receiving section 542 can be decreased, thereby being effective. For this reason, it is preferable to provide grooves at least in the contact surfaces 243-n.

Further, in the foregoing embodiment, V-shaped or rectangular grooves were provided in both the contact surfaces 243-n (n=1, 2, . . . ) and the non-contact surfaces 244-n (n=1, 2, . . . ). However, the non-contact surfaces 244-n (n=1, 2, . . . ) may be subjected to a treatment to make their surfaces coarse, instead of being provided with grooves. Even by applying a treatment to make the surface coarse, the light emitted from the light emitting section 541 can be diffused. In contrast, if the contact surfaces 243-n (n=1, 2, . . . ) are subjected to a treatment to make their surfaces coarse and the difference in height of the depressions and protrusions on the contact surfaces 243-n is too small, then the contact surfaces will get scraped due to contact with the paper S, and as a result, the surfaces will no longer be able to diffuse light. Therefore, the difference in the height of the depressions and protrusions on the contact surfaces 243-n should preferably be larger than the difference in the height of the depressions and protrusions on the non-contact surfaces 244-n (n=1, 2, . . . ). Also, the depth of the grooves provided in the contact surfaces 243-n (n=1, 2, . . . ) may be made deeper than the depth of the grooves provided in the non-contact surfaces 244-n (n=1, 2, . . . ).

Further, in the foregoing embodiment, the contact surfaces 243-n (n=1, 2, . . . ), which come into contact with the paper S, and the non-contact surfaces 244-n (n=1, 2, . . . ), which do not come into contact with the paper S, were connected alternately to form the medium supporting section 241. However, the medium supporting section 241 may be formed only of the contact surfaces 243-n (n=1, 2, . . . ). It should be noted that with such a structure, the paper S may rise up from the platen 24.

Further, the medium supporting section 241 may be formed by contact surfaces 243-n (n=1, 2, . . . ) and non-contact surfaces 244-n (n=1, 2, . . . ) being connected alternately and arranged to match the positions of the side edges of paper of various sizes such as A4 and A3.

Further, in the foregoing embodiment, the side edge of the paper S was detected based on a difference between the output value of the light receiving section 542 when it detected light reflected from the paper S and the output value of the light receiving section 542 when it detected light reflected from the medium supporting section 241. However, the upper end or the lower end of the paper S may instead be detected based on the difference between the output value of the light receiving section 542 when it detects light reflected from the paper S and the output value of the light receiving section 542 when it detects light reflected from the medium supporting section 241.

Figure 13:
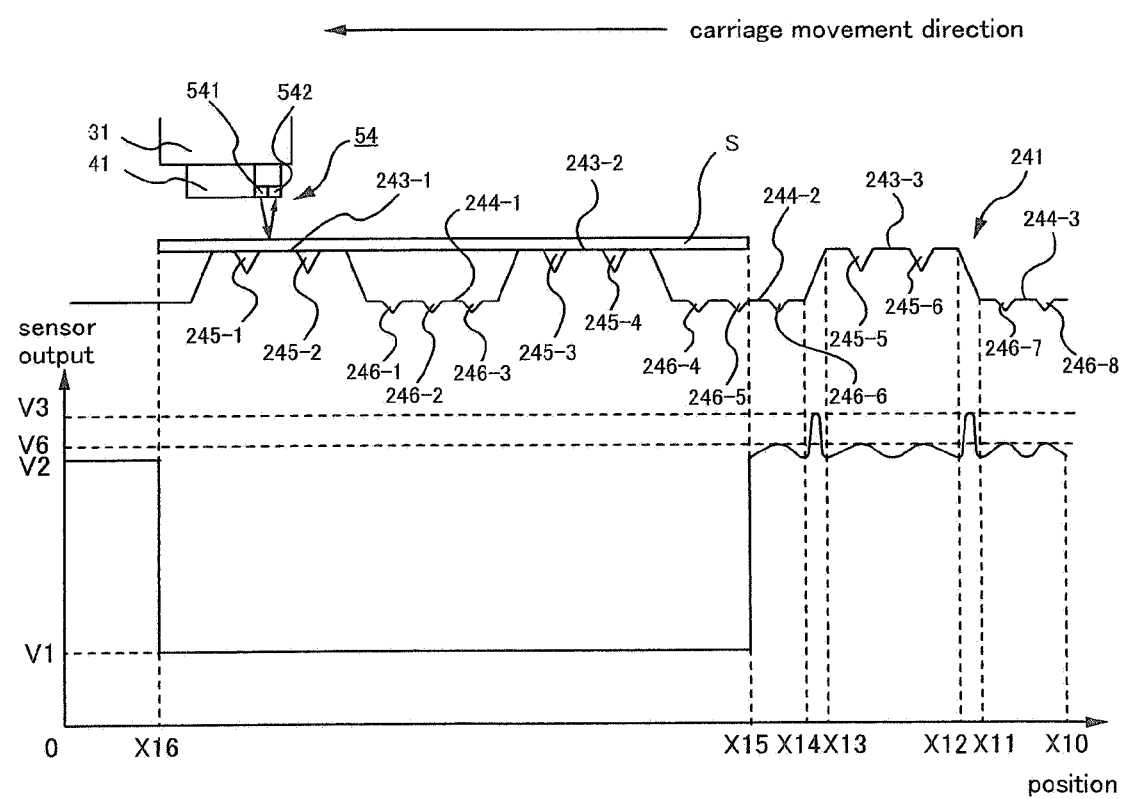
FIG. 13 is an explanatory diagram showing an example of relative structures of V-shaped grooves provided in the contact surfaces 243-n and the non-contact surfaces 244-n of the medium supporting section 241.

FIG. 13 is an explanatory diagram of a medium supporting section 241 in accordance with another embodiment. As shown in the figure, the supporting section 241 has contact surfaces 243-n (n=1, 2, . . . ) and non-contact surfaces 244-n (n=1, 2, . . . ). As in the embodiment shown in FIG. 10, two V-shaped grooves 245-n (n=1, 2, . . . ) are formed in each contact surface 243-n (n=1, 2, . . . ), and three V-shaped grooves 246-n (n=1, 2, . . . ) are formed in each non-contact surface 244-n (n=1, 2, . . . ). Furthermore, in FIG. 13, a height of the grooves 245-n (n=1, 2, . . . ) in the contact surfaces 243-n (n=1, 2, . . . ) is larger than the height of the grooves 246-n (n=1, 2, . . . ) in the non-contact surfaces 244-n (n=1, 2, . . . ).

What is claimed is:

1. A medium detection apparatus comprising:
   a light emitting section adapted to emit light;
   a light receiving section adapted to detect reflected light and output an output value in accordance with an amount of the reflected light;
   a medium supporting section adapted to support a medium and having a diffusing section adapted to diffuse the light emitted from said light emitting section; and
   a controller adapted to detect an edge of said medium based on a difference between the output value of said light receiving section when said light receiving section detects light reflected from said medium and the output value of said light receiving section when said light receiving section detects light reflected from said medium supporting section,
   wherein said medium supporting section has a contact surface that comes into contact with said medium, and a non-contact surface that does not come into contact with said medium,
   wherein said diffusing section is formed in said contact surface and said non-contact surface,
   wherein said diffusing section is formed by providing a depression and a protrusion on said contact surface and said non-contact surface; and
   wherein a difference in height of the depression and the protrusion of said diffusing section formed on said contact surface is larger than a difference in height of the depression and the protrusion of said diffusing section formed on said non-contact surface.

2. A medium detection apparatus according to claim 1, wherein said diffusing section is a V-shaped groove.

3. A medium detection apparatus according to claim 1, wherein said diffusing section is a rectangular groove.

4. A medium detection apparatus according to claim 2, wherein said groove is formed along a direction in which said medium is carried.

5. A medium detection apparatus according to claim 1, wherein at least one said diffusing section is within a range in which said light emitting section emits light.

6. A medium detection apparatus according to claim 1, wherein at least one said diffusing section is within a range in which said light receiving section detects said reflected light.

7. A medium detection apparatus comprising:

a light emitting section adapted to emit light;

a light receiving section adapted to detect reflected light and output an output value in accordance with an amount of the reflected light;

a medium supporting section adapted to support a medium and having a diffusing section adapted to diffuse the light emitted from said light emitting section; and a controller adapted to detect an edge of said medium based on a difference between the output value of said light receiving section when said light receiving section detects light reflected from said medium and the output value of said light receiving section when said light receiving section detects light reflected from said medium supporting section;

wherein said medium supporting section has a contact surface that comes into contact with said medium, and a non-contact surface that does not come into contact with said medium;

wherein said diffusing section is formed said contact surface and said non-contact surface;

wherein said diffusing section is formed by providing a depression and a protrusion on said contact surface and said non-contact surface, and a difference in height of the depression and the protrusion of said diffusing section formed on said contact surface is larger than a difference in height of the depression and the protrusion of said diffusing section formed on said non-contact surface;

wherein said diffusing section is a V-shaped groove;

wherein said groove is formed along a direction in which said medium is carried;

wherein at least one said diffusing section is within a range in which said light emitting section emits light; and wherein at least one said diffusing section is within a range in which said light receiving section detects said reflected light.

8. A medium detection method comprising:

detecting an edge of a medium based on a difference between an output value of a light receiving section when said light receiving section detects light reflected from said medium and the output value of said light receiving section when said light receiving section detects light reflected from a medium supporting section that is adapted to support said medium and that has a diffusing section adapted to diffuse the light emitted onto said medium supporting section, wherein said medium supporting section has a contact surface that comes into contact with said medium, and a non-contact surface that does not come into contact with said medium, wherein said diffusing section is formed in said contact surface and said non-contact surface, wherein said diffusing section is formed by providing a depression and a protrusion on said contact surface and said non-contact surface; and wherein a difference in height of the depression and the protrusion of said diffusing section formed on said contact surface is larger than a difference in height of the depression and the protrusion of said diffusing section formed on said non-contact surface.

* * * * *